(12) United States Patent
Tada

(10) Patent No.: US 11,192,319 B2
(45) Date of Patent: Dec. 7, 2021

(54) METHOD FOR CUTTING BELT-LIKE MEMBER, AND APPARATUS THEREFOR

(71) Applicant: The Yokohama Rubber Co., LTD., Tokyo (JP)

(72) Inventor: Hirotaro Tada, Hiratsuka (JP)

(73) Assignee: The Yokohama Rubber Co., LTD.

(*) Notice: Subject to any disclaimer, the term of this patent is extended or adjusted under 35 U.S.C. 154(b) by 1503 days.

(21) Appl. No.: 15/034,390

(22) PCT Filed: Nov. 6, 2014

(86) PCT No.: PCT/JP2014/079497
§ 371 (c)(1),
(2) Date: May 4, 2016

(87) PCT Pub. No.: WO2015/068777
PCT Pub. Date: May 14, 2015

(65) Prior Publication Data
US 2016/0297159 A1 Oct. 13, 2016

(30) Foreign Application Priority Data
Nov. 6, 2013 (JP) .............................. JP2013-230183

(51) Int. Cl.
| | | |
|---|---|---|
| *B29D 30/46* | (2006.01) | |
| *B26D 1/00* | (2006.01) | |
| *B26D 5/00* | (2006.01) | |

(52) U.S. Cl.
CPC ........... *B29D 30/46* (2013.01); *B26D 1/0006* (2013.01); *B26D 5/007* (2013.01);
(Continued)

(58) Field of Classification Search
CPC .. B29D 30/46; B29D 30/68; B29D 2030/463; B29D 2030/466; B29D 2030/685;
(Continued)

(56) References Cited

U.S. PATENT DOCUMENTS 3,719,114 A * 3/1973 Vischulis ............... B26D 7/015
83/74
4,173,912 A * 11/1979 Holp ..................... B26D 1/035
83/368

FOREIGN PATENT DOCUMENTS

| JP | H06-0293206 | 10/1994 |
| JP | 2002-321290 | 11/2002 |

(Continued)

OTHER PUBLICATIONS

International Search Report for International Application No. PCT/JP2014/079497 dated Feb. 3, 2015, 2 pages, Japan.

*Primary Examiner* — Clark F Dexter
(74) *Attorney, Agent, or Firm* — Thorpe North & Western

(57) ABSTRACT

When manufacturing a plurality of strip members by cutting a belt-like member along a length direction thereof, the belt-like member having embedded therein a plurality of reinforcement cords arranged parallel to each other, and a weft thread that intersects the reinforcement cords, a captured image showing images of at least the reinforcement cords in a cross section of one end of the belt-like member in the length direction is used to detect the position of the image of each of the reinforcement cords (RC). The number of the actual reinforcement cord (RC) to which each of the images of the reinforcement cords (RC) corresponds is determined on the basis of an interval between the images of the detected adjacent reinforcement cords (RC) in the image and an average cord interval, and a cutting position (Xa) is set.

24 Claims, 12 Drawing Sheets

(52) U.S. Cl.
CPC ....... *B29D 2030/466* (2013.01); *Y10S 83/951* (2013.01); *Y10T 83/538* (2015.04)

(58) Field of Classification Search
CPC ...... B26D 1/0006; B26D 3/003; B26D 3/005; B26D 5/007; Y10S 83/951; Y10T 83/536; Y10T 83/538
USPC .............................. 83/367, 368, 951; 157/13
See application file for complete search history.

(56) References Cited

FOREIGN PATENT DOCUMENTS

| | | |
|---|---|---|
| JP | 2006-002824 | 1/2006 |
| JP | 5168576 | 3/2013 |

\* cited by examiner

METHOD FOR CUTTING BELT-LIKE MEMBER, AND APPARATUS THEREFOR

TECHNICAL FIELD

The present technology relates to a method for cutting a belt-like member having embedded therein a plurality of reinforcement cords arranged parallel to each other, along the reinforcement cords, and an apparatus therefor.

BACKGROUND ART

In manufacturing steps of an automobile tire, a strip member is sometimes wound onto the outer peripheral surface of a belt member. The strip member is obtained by cutting a belt-like member having embedded therein a plurality of reinforcement cords arranged parallel to each other, along the reinforcement cords.

In general, as a method for cutting this belt-like member, a method is known in which, as well as irradiating electromagnetic wave radiation, such as X rays or gamma rays, onto the belt-like member having embedded therein the plurality of reinforcement cords arranged parallel to each other, and detecting an embedded position of each of the reinforcement cords on the basis of energy of the electromagnetic wave radiation dispersed by the belt-like member, a cutting position of the belt-like member is determined on the basis of the detection results (see Japanese Unexamined Patent Application Publication No. H06-293206A).

Further, as a tire reinforcement member, a jointless strip member is sometimes wound onto the belt member. At that time, a method and an apparatus are known in which, instead of cutting a belt-like member at a constant width, the number of the reinforcement cords of the belt-like member is counted using image processing before the strip member is manufactured, and the cutting is performed at a constant number of the reinforcement cords (see Japanese Patent No. 5168576).

Further, in the above-described jointless belt-like member, it is known that another type of cord (hereinafter referred to as a weft thread) may also be embedded, where necessary, in a direction orthogonal to the reinforcement cords (see Japanese Unexamined Patent Application Publication No. 2006-002824A).

In the above-described method where the cutting is performed at the constant number of reinforcement cords, first, an image pick-up device performs image capture of cutting means capable of moving in a width direction of the belt-like member, as well as of a portion of the belt-like member including a first side in the width direction at one end in the length direction of the belt-like member (hereinafter, this end is referred to as a downstream end). Additionally, on a captured image captured by the image pick-up device, a position of each of the reinforcement cords appearing at the downstream end in the length direction of the belt-like member and a position of the cutting means are detected. In addition, using the detection results of the position of each of the reinforcement cords and the position of the cutting means, the cutting means is caused to move in the width direction of the belt-like member toward a second side on the opposite side to the first side, until the cutting means is arranged in a position, on the captured image, at which the cutting means can perform cutting between the reinforcement cord of a predetermined number from one side in the width direction of the belt-like member and the next reinforcement cord.

After that, a cut is made in the downstream end in the length direction of the belt-like member, by the cutting means.

Next, on the captured image, an image pick-up device stop range is set further to the first edge in the width direction of the belt-like member than the position of the cutting means. After that, the cutting means is caused to move toward the second side on the opposite side to the first edge of the belt-like member, until the detected position of the cutting means on the captured image enters into the image pick-up device stop range.

After that, the position of each of the reinforcement cords appearing at the downstream end in the length direction of the belt-like member and the position of the cutting means are detected on the captured image captured by the image pick-up device. Further, using the detection results of the position of each of the reinforcement cords and the position of the cutting means, the cutting means is caused to move toward the second side of the belt-like member, until the cutting means is arranged in a position at which the cutting means can perform cutting between the reinforcement cord of a predetermined number from the position at which the immediately preceding cut has been made and the next reinforcement cord, on the captured image.

By repeating the above steps a predetermined number of times, the cutting of the belt-like member is automatically performed.

Here, as described above, with respect to the belt-like member having the weft thread embedded in the direction orthogonal to the reinforcement cords, when the weft thread is entangled with the adjacent reinforcement cords, a problem arises in that the number of reinforcement cords cannot be correctly counted, and the cutting cannot be performed at the constant number of reinforcement cords.

SUMMARY

The present technology provides a method for cutting a belt-like member, and an apparatus therefor, which enable the strip member formed by cutting the belt-like member to reliably be provided with a desired number of the reinforcement cords.

A first aspect of the present technology is a method for cutting a belt-like member for manufacturing a plurality of strip members by cutting the belt-like member along a length direction of the belt-like member. This cutting method includes the steps of:

capturing an image of a cross section of one end in a length direction of a belt-like member having embedded therein a plurality of reinforcement cords arranged in parallel to each other and a weft thread that intersects the reinforcement cords, detecting a position, in a width direction of the belt-like member, of an image of each of the reinforcement cords appearing in the cross section within the captured image obtained by the image capture, along with setting detection numbers representing an arrangement order of the detected reinforcement cords from a first side in the width direction of the belt-like member, calculating an interval L between the reinforcement cords for the detection numbers of the reinforcement cords that are adjacent to each other, setting an actual number that is obtained by correcting, depending on a ratio of the interval L to an average cord interval Lm between the adjacent reinforcement cords, a larger detection number of the detection numbers of the reinforcement cords for the detection numbers that are adjacent to each other so as to make the larger detection number larger, and determining a cutting position in the width direction of the belt-like member using the actual number, such that the number of the reinforcement cords included in a strip member made from the belt-like member is a set number.

When the interval L and the average cord interval Lm satisfy Lm×(p+k)≤L<Lm×(P+2−k) (where p is an integer equal to or greater than 0, and k is a number equal to or greater than 0.2 and equal to or less than 0.8), it is preferable that, with respect to a larger detection number of the detection numbers of the adjacent reinforcement cords, a sum of the larger detection number and the integer p is set as the actual number.

It is preferable that the cutting position be a position between the adjacent reinforcement cords among the reinforcement cords.

Upon manufacturing the strip member having embedded therein a number t (t is a natural number) of the reinforcement cords, when the reinforcement cord having the t-th actual number is not detected and the reinforcement cord having an N-th actual number that is smaller than the t-th actual number is detected, it is preferable that the cutting position be established using a position of the N-th reinforcement cord and the average cord interval Lm.

It is preferable that the N-th reinforcement cord be the reinforcement cord having the largest number among the plurality of actual numbers smaller than the t-th actual number.

It is preferable that the cutting position be separated from the position of the N-th reinforcement cord to a side opposite to the first edge in the width direction, by Lm×(t+1−N)−Lm×j (where j is a number greater than 0 and less than 1).

It is preferable that the position, in the width direction of the belt-like member, of the image of the reinforcement cord be a position of an end portion of the image of the reinforcement cord in the width direction.

It is preferable that a distribution of an average cord interval for each of locations on the belt-like member be acquired in advance and that, using the distribution, the average cord interval Lm be set corresponding to each of the locations on the belt-like member from which the strip member is to be made.

After the cutting position has been determined and a cut has been made in the cutting position, it is preferable that the following steps be repeated:

performing, with respect to a portion of the belt-like member to be cut on the basis of the determination of the cutting position, image capture of a cross section of the one end in the length direction of the belt-like member at a portion adjoining an opposite side to the first side;

detecting the position, in the width direction of the belt-like member, of the image of each of the reinforcement cords appearing in the cross section within the captured image obtained by the image capture;

setting the detection numbers representing an order of arrangement, from the first side in the width direction of the belt-like member, of the reinforcement cords of the adjoining portion using the captured image of the adjoining portion;

calculating an interval L between the reinforcement cords for the detection numbers of the reinforcement cords that are adjacent;

setting an actual number that is obtained by correcting, depending on a ratio of the interval L to the average cord interval Lm between the adjacent reinforcement cords, the larger detection number of the detection numbers of the reinforcement cords for the detection numbers that are adjacent to each other so as to make the larger detection number larger; and determining a cutting position in the width direction of the belt-like member using the actual number, such that the number of the reinforcement cords included in the strip member made from the belt-like member is a set number.

In the captured image, in addition to the images of the reinforcement cords, the image of the weft thread may also be captured.

Another aspect of the present technology is a belt-like member cutting apparatus for manufacturing a plurality of strip members by cutting a belt-like member along a length direction of the belt-like member. The cutting apparatus has:

an image pick-up device for capturing an image of a cross section of one end in a length direction of a belt-like member having embedded therein a plurality of reinforcement cords arranged in parallel to each other;

a position detecting unit configured to detect, in the captured image of the cross section of one end in a length direction of a belt-like member having embedded therein a plurality of reinforcement cords arranged in parallel to each other and a weft thread that intersects the reinforcement cords, a position in a width direction of the belt-like member of an image of each of the reinforcement cords appearing in the cross section, and to set detection numbers representing an arrangement order of the reinforcement cords from a first side in the width direction of the belt-like member;

an interval calculating unit configured to calculate an interval L between the reinforcement cords for the detection numbers of the reinforcement cords that are adjacent to each other;

an actual number setting unit configured to set an actual number that is obtained by correcting, depending on a ratio of the interval L to an average cord interval Lm between the adjacent reinforcement cords, a larger detection number of the detection numbers of the reinforcement cords for the detection numbers that are adjacent to each other such that the larger detection number is made larger;

a cutting position determining unit configured to determine a cutting position in the width direction of the belt-like member using the actual number, such that the number of the reinforcement cords included in a strip member made from the belt-like member is a set number; and a cutter configured to manufacture the strip member by cutting the belt-like member at the determined cutting position.

When L and Lm satisfy Lm×(p+k)≤L<Lm×(p+2−k) (where p is an integer equal to or greater than 0, and k is a number equal to or greater than 0.2 and equal to or less than 0.8), it is preferable that, with respect to the larger number of the detection numbers of the adjacent reinforcement cords, the actual number setting unit sets a sum of the larger detection number and the integer p as the actual number.

It is preferable that the cutting position determined by the cutting position determining unit be a position between the adjacent reinforcement cords among the reinforcement cords.

Upon manufacturing the strip member having embedded therein a number t (t is a natural number) of the reinforcement cords, when the cutting position determining unit does not detect the reinforcement cord having the t-th actual number and detects the reinforcement cord having an N-th actual number that is smaller than the t-th actual number, it is preferable that the cutting position be established using a position of the N-th reinforcement cord and the average cord interval Lm.

It is preferable that the N-th reinforcement cord be the reinforcement cord having the largest number among the plurality of actual numbers smaller than the t-th actual number.

It is preferable that the cutting position determining unit establish the cutting position as a position separated from the position of the N-th reinforcement cord to a side opposite to the first edge in the width direction, by Lm×(t+1−N)−Lm×j (where j is a number greater than 0 and less than 1).

It is preferable that the position detecting unit establish, as the position in the width direction of the belt-like member of the image of the reinforcement cord, a position of an end portion in the width direction of the image of the reinforcement cord.

It is preferable that the actual number setting unit acquire a distribution of an average cord interval for each of locations on the belt-like member in advance and, using the distribution, set the average cord interval Lm corresponding to each of the locations on the belt-like member from which the strip member is to be made.

The image pick-up device also captures, as the captured image, an image of the weft thread in addition to the images of the reinforcement cords.

According to the above-described method for cutting the belt-like member and the apparatus therefor, the strip member formed by cutting the belt-like member can be reliably provided with the desired number of reinforcement cords.

DETAILED DESCRIPTION

Figure 1:
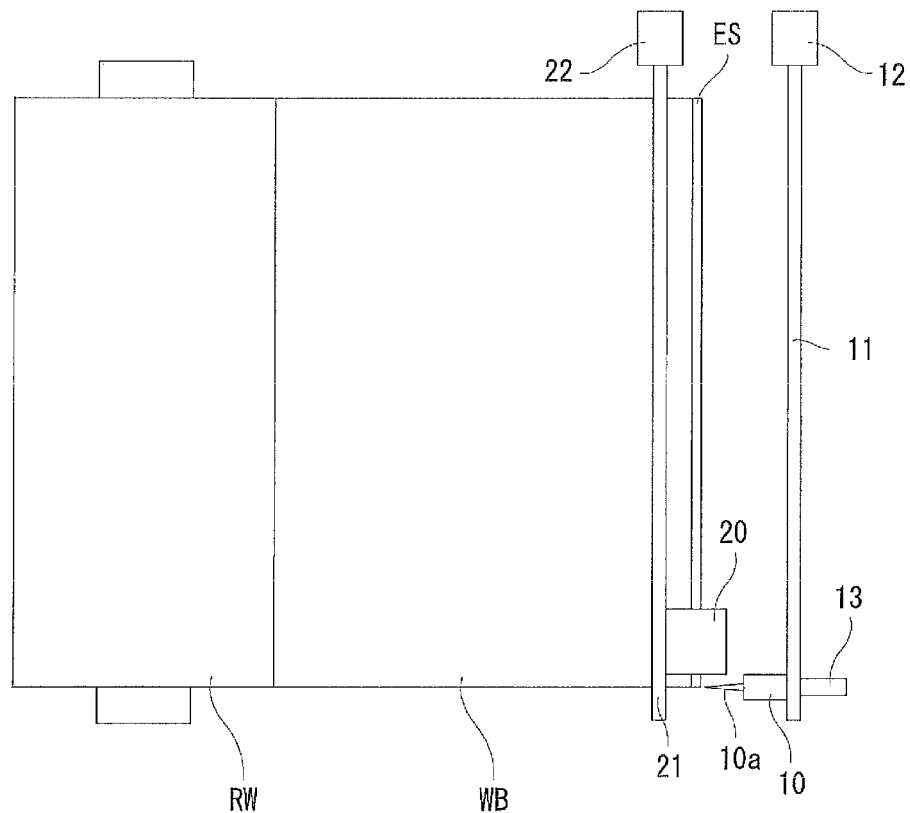
FIG. 1 is a plan view of main parts of a belt-like member cutting apparatus according to an embodiment of the present technology.
Figure 2:
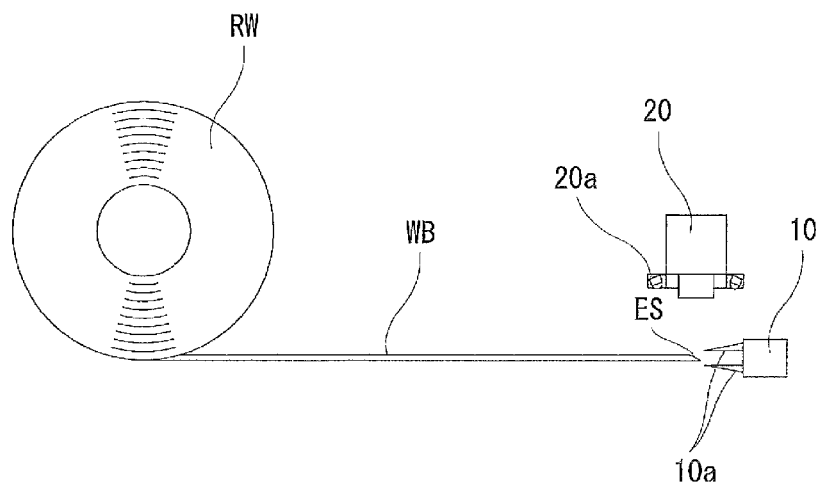
FIG. 2 is a side view of main parts of the belt-like member cutting apparatus according to the embodiment of the present technology.
Figure 3:
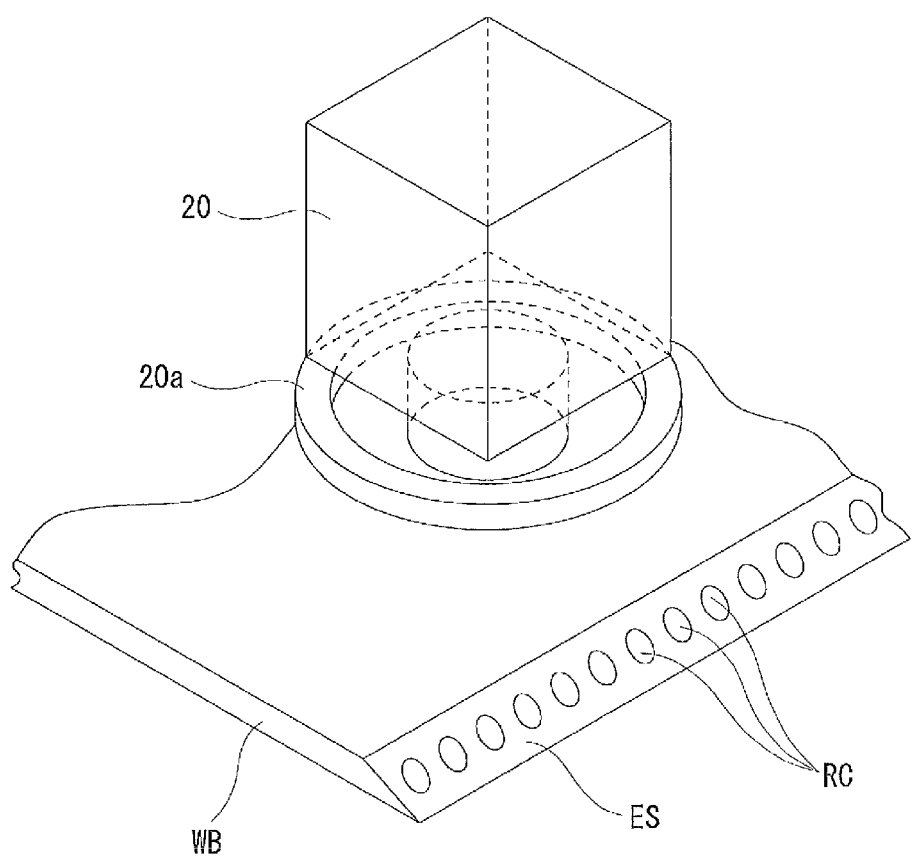
FIG. 3 is a perspective view illustrating a positional relationship between the belt-like member and an image pick-up device according to the embodiment of the present technology.
Figure 4:
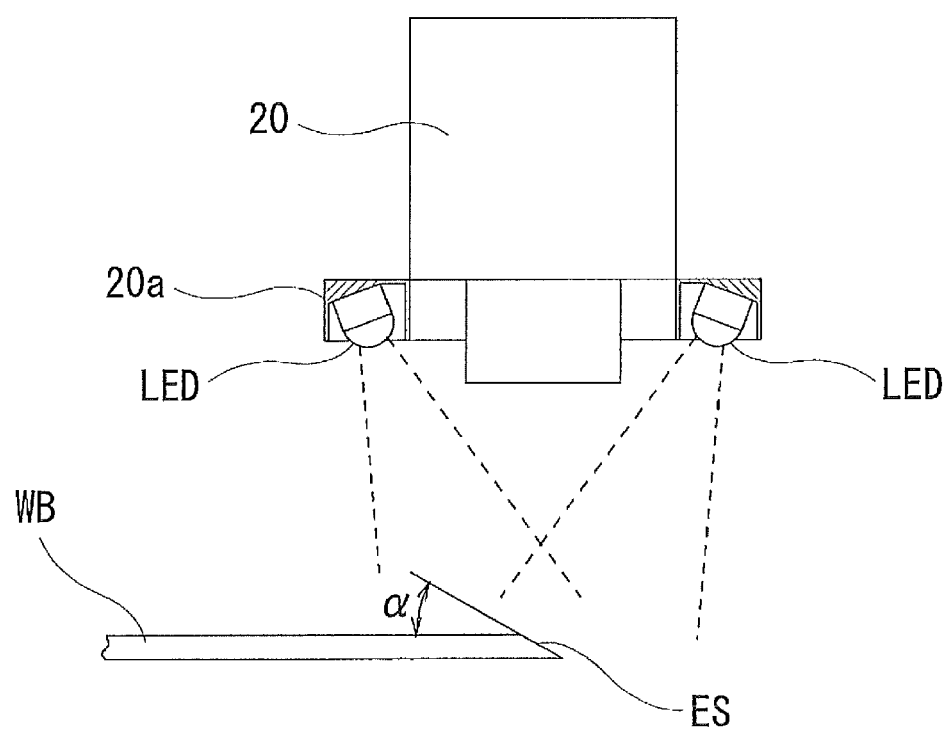
FIG. 4 is a side view illustrating the positional relationship between the belt-like member and the image pick-up device according to the embodiment of the present technology.
Figure 5:
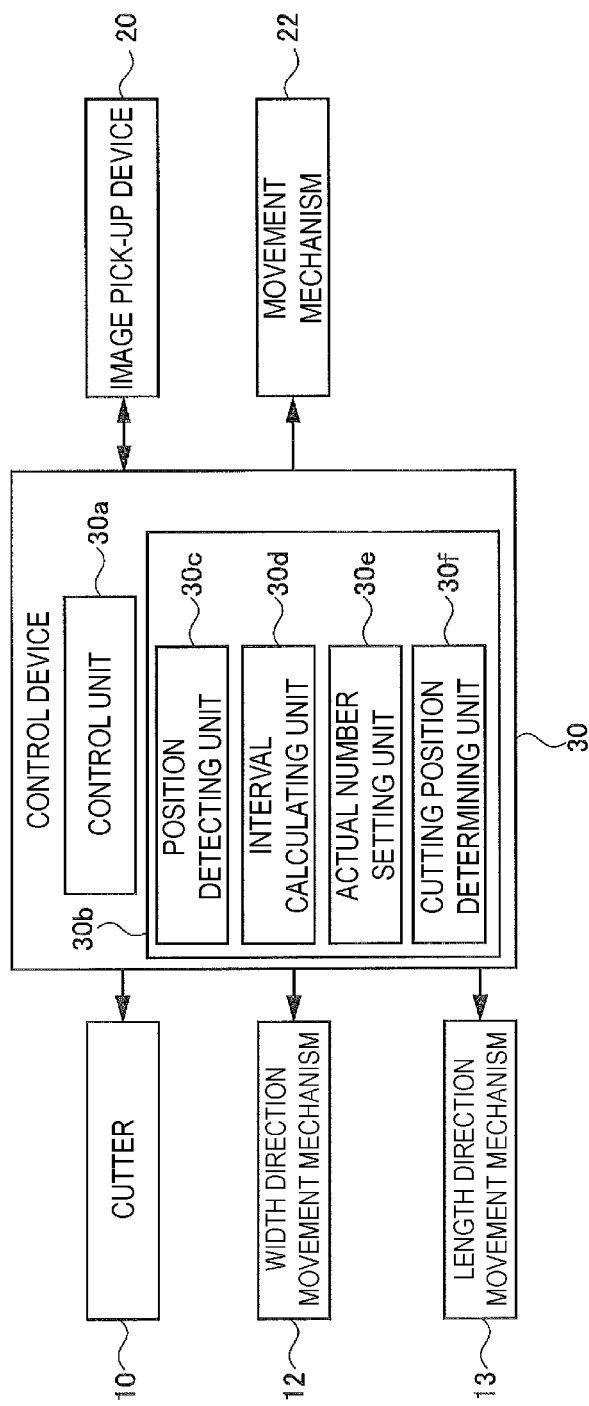
FIG. 5 is a block diagram of the belt-like member cutting apparatus according to the embodiment of the present technology.
Figure 6:
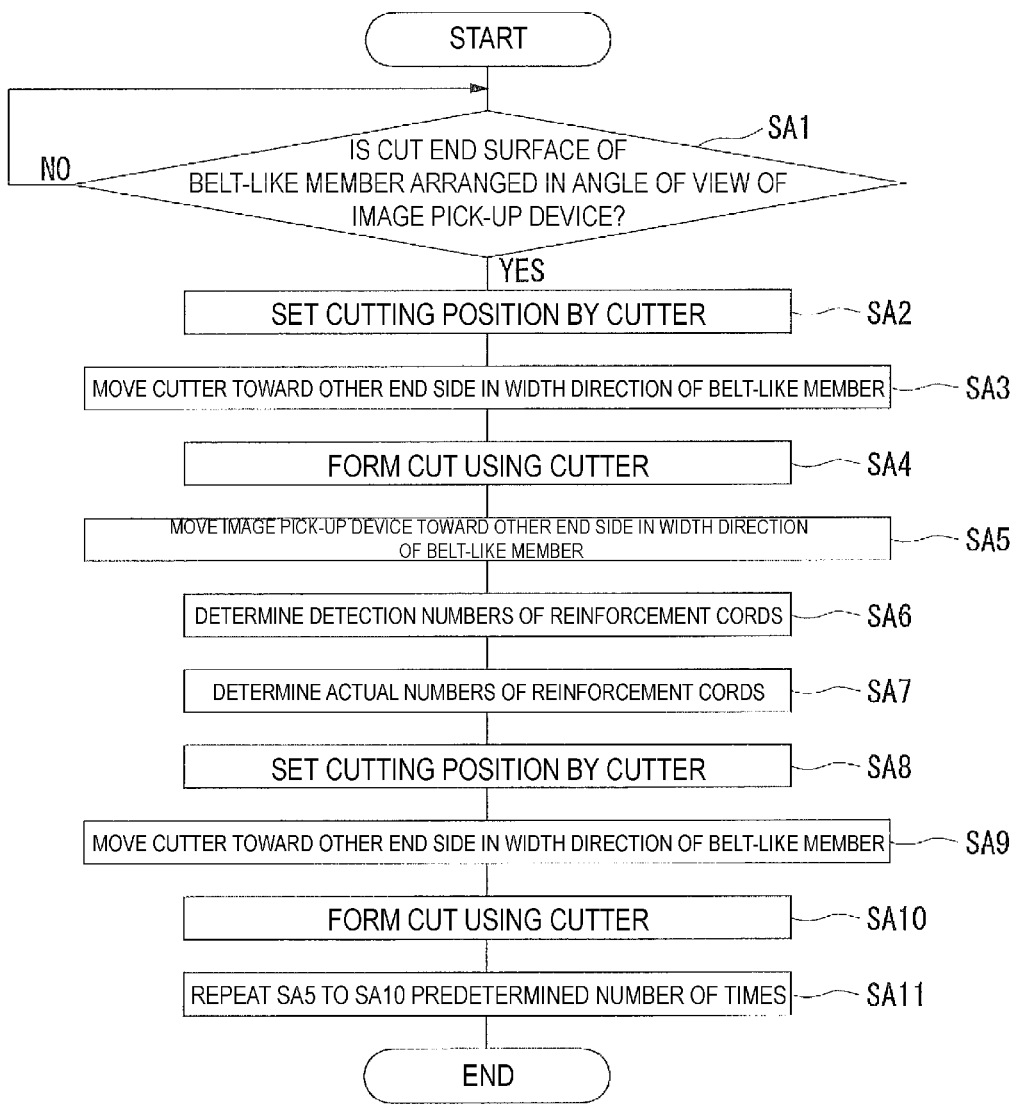
FIG. 6 is a flow chart depicting operations of a control device according to the embodiment of the present technology.
Figure 7:
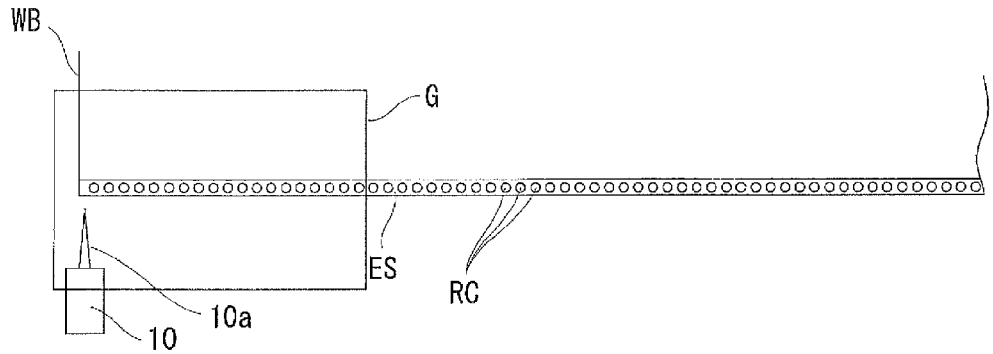
FIG. 7 is a schematic view illustrating positional relationships between the image pick-up position, a cutter, and the belt-like member according to the embodiment of the present technology.

FIGS. 1 to 9 and 12 to 19 illustrate a present embodiment, where FIG. 1 is a plan view of main parts of a belt-like member cutting apparatus, FIG. 2 is a side view of main parts of the belt-like member cutting apparatus, FIG. 3 is a perspective view illustrating a positional relationship between the belt-like member and an image pick-up device, FIG. 4 is a side view illustrating the positional relationship between the belt-like member and the image pick-up device, FIG. 5 is a block diagram of the belt-like member cutting apparatus, FIG. 6 is a flow chart depicting operations of a control device, FIG. 7 is a schematic view illustrating positional relationships between the image pick-up position, a cutter, and the belt-like member, and FIGS. 8 to 19 are explanatory diagrams of operations of the belt-like member cutting apparatus.

This belt-like member cutting apparatus has a cutter 10, an image pick-up device 20, a plurality of cutting blades CT, and a plurality of winding rollers RL.

The cutter 10 is movably provided in a width direction of a belt-like member WB pulled out from a belt-like member wound body RW. The cutter 10 is cutting means capable of forming cuts in a downstream end in a length direction of the belt-like member WB.

The image pick-up device 20 is movably provided in the width direction of the belt-like member WB pulled out from the belt-like member wound body RW.

The plurality of cutting blades CT are arranged with intervals therebetween in the width direction of the belt-like member WB pulled out from the belt-like member wound body RW.

Each of the plurality of winding rollers RL winds up each of strip members SP formed by each of the cutting blades CT passing through the belt-like member WB.

The belt-like member WB is formed of an unvulcanized rubber material and is formed in a belt shape. For example, a thickness dimension thereof is several mm, a width dimension thereof is substantially 240 mm, and a length dimension thereof is several tens of m. Further, reinforcement cords RC are embedded in the belt-like member WB so as to be arranged side by side with each other. Specifically, for example, 240 of the reinforcement cords RC are embedded so as to be arranged substantially parallel to each other, which form a product generally called 70 ends. The 70 ends is formed of 70 of the reinforcement cords arranged over a distance of a width of 50 mm. Each of the reinforcement cords RC is formed of a metal cord or a rigid fiber cord such as polyester or nylon. Each of the reinforcement cords RC is embedded so as to extend in the length direction of the belt-like member WB. A cut end surface ES is formed on the downstream end in the length direction of the belt-like member WB. This cut end surface ES is an inclined cross section obtained by diagonally cutting the downstream end in the length direction of the belt-like member WB, such that the cut end surface ES is oriented to one side in the thickness direction of the belt-like member WB. Further, cross sections of each of the reinforcement cords RC appear in the cut end surface ES of the downstream end in the length direction of the belt-like member WB. Further, as illustrated in FIG. 4, it is preferable that an angle α formed by the cut end surface ES and one surface in the thickness direction of the belt-like member be equal to or greater than 30 degrees and equal to or less than 60 degrees. In the present embodiment, the cut end surface ES is cut so as to be within this angle range.

The cutter 10 has a pair of blades 10a that can be opened and closed in the thickness direction of the belt-like member WB.

The cutter 10 is supported by a frame 11 provided so as to extend in the width direction of the belt-like member WB. The cutter 10 is configured to be moved in the width direction of the belt-like member WB by a width direction movement mechanism 12 provided on the frame 11.

Further, a length direction movement mechanism 13, which moves the cutter 10 in the length direction of the belt-like member WB, is provided on the frame 11. In this way, in front of the downstream end in the length direction of the belt-like member WB, the cutter 10 can movably operate in the width direction of the belt-like member WB. In addition, due to the length direction movement mechanism 13, the cutter 10 can move toward an upstream end in the length direction of the belt-like member WB. In this way, the downstream end in the length direction of the belt-like member WB is caused to be positioned between each of the blades 10a, and, by closing each of the blades 10a, a cut can be made in the downstream end in the length direction of the belt-like member WB.

The image pick-up device 20 is formed by a known CCD camera, for example. The image pick-up device 20 is arranged so as to capture an image of the cross section on the downstream end in the length direction of the belt-like member WB. Here, the cross section whose image is captured as described above is the cut end surface ES, and the cut end surface ES is the inclined surface oriented to the one side in the thickness direction of the belt-like member WB. As a result, the image pick-up device 20 can capture an image of the cut end surface ES as the cross section on the downstream end in the length direction of the belt-like member WB from the one side in the thickness direction of the belt-like member WB. Note that, in the present embodiment, the inclined cut end surface ES is used as the cross section of the downstream end in the length direction of the belt-like member WB, but the image pick-up device 20 may capture an image of a cross section obtained by cutting the downstream end in the length direction of the belt-like member WB in the thickness direction.

Further, a lighting device 20a having a ring shaped frame is attached to the image pick-up device 20, for example, and a plurality of light emitting diodes LED are attached to the bottom surface of the ring shaped frame. Specifically, the lighting device 20a is configured to illuminate the cut end surface ES on the downstream end in the length direction of the belt-like member WB, from the vicinity of the image pick-up device 20.

The image pick-up device 20 is supported by a frame 21 provided so as to extend in the width direction of the belt-like member WB, and the image pick-up device 20 is moved in the width direction of the belt-like member WB by a movement mechanism 22 provided on the frame 21. Note that the width direction movement mechanism 12, the length direction movement mechanism 13, and the movement mechanism 22 are configured using a servo motor, and a ball screw, for example.

The cutter 10, the width direction movement mechanism 12, the length direction movement mechanism 13, the image pick-up device 20, and the movement mechanism 22 are connected to a control device 30 configured by a known computer (see FIG. 5).

In addition, on a captured image G that is successively captured by the image pick-up device 20, the control device 30 is configured to detect, for each of the captured images G, positions of each of the reinforcement cords RC appearing in the cut end surface ES on the downstream end in the length direction of the belt-like member WB, and a position of the blades 10a of the cutter 10. The control device 30 is further configured to control the cutter 10, the width direction movement mechanism 12, the length direction movement mechanism 13, the image pick-up device 20, and the movement mechanism 22 on the basis of the positions of each of the reinforcement cords RC and of the blades 10a.

The control device 30 has a control unit 30a and a processing unit 30b. The control unit 30a is configured to control operations of the cutter 10, the width direction movement mechanism 12, the length direction movement mechanism 13, and the movement mechanism 22.

The processing unit 30b is configured to perform processing on the captured image transmitted from the image pick-up device 20, and determine the cutting position on the belt-like member WB. Specifically, the processing unit 30b has a position detecting unit 30c, an interval calculating unit 30d, an actual number setting unit 30e, and a cutting position determining unit 30f.

The control device 30 is configured, for example, by a computer having a CPU and a memory. In this case, the control unit 30a and the processing unit 30b are formed as a software module, by activating a program stored in a memory (not illustrated). Specifically, the control unit 30a, the position detecting unit 30c, the interval calculating unit 30d, the actual number setting unit 30e, and the cutting position determining unit 30f are a software module.

Figure 8:
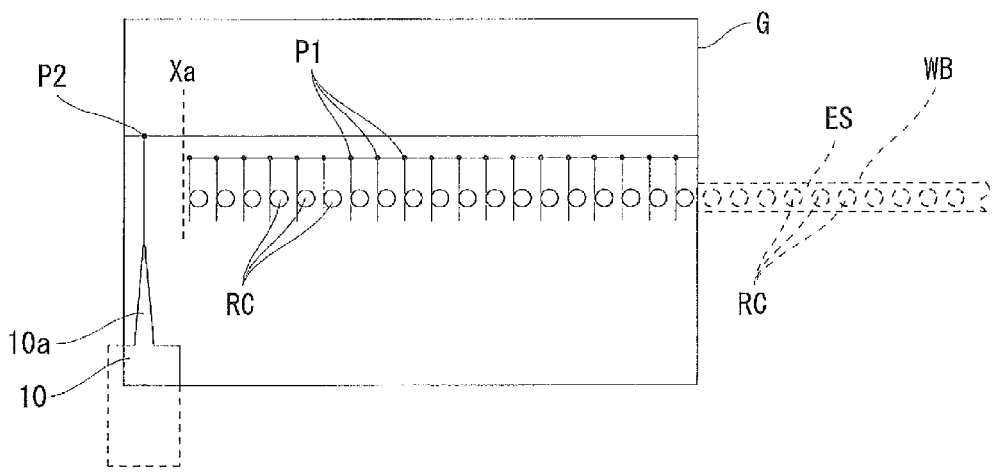
FIG. 8 is an explanatory view of operations of the belt-like member cutting apparatus according to the embodiment of the present technology.
Figure 9:
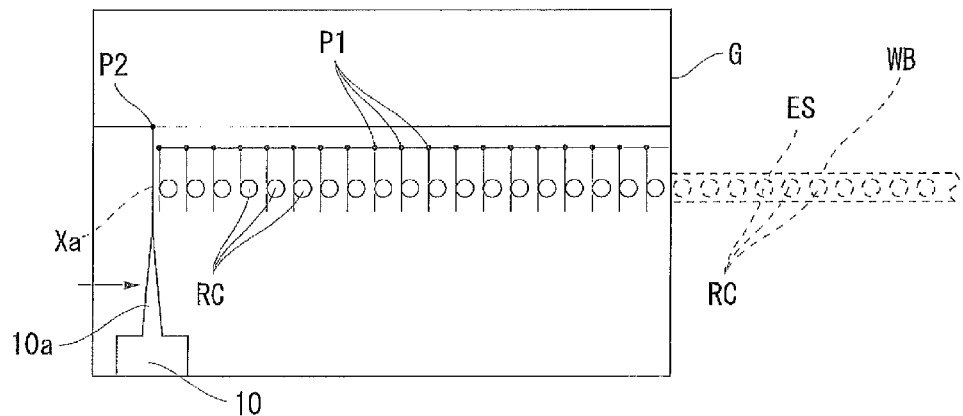
FIG. 9 is an explanatory view of operations of the belt-like member cutting apparatus according to the embodiment of the present technology.

The position detecting unit 30c performs known image processing on the captured image G of the image pick-up device 20, such as averaging processing, binarization processing, and expansion processing, and thus performs display such that, on the captured image G, only images of each of the reinforcement cords RC and the blades 10a are displayed in white, for example. As illustrated in FIGS. 7-9, for example, the control device 30 is configured to continuously detect, on the captured image G, a position (a coordinate) P1 of each of the reinforcement cords RC in the width direction of the belt-like member of the downstream end (a right end of each of the reinforcement cords RC in FIG. 1) in the length direction of the belt-like member, and a position (a coordinate) P2 of tip ends of the blades 10a in the width direction of the belt-like member. Operations of the position detecting unit 30c, the interval calculating unit 30*d*, the actual number setting unit 30*e*, and the cutting position determining unit 30*f* will be described in the following description of a method to determine the cutting position.

In the description below, the width direction of the belt-like member WB matches a latitudinal direction of the captured image G. Calibration is performed in advance such that the coordinates of the positions detected from the captured image according to the present embodiment correspond to numerical values of coordinates of corresponding actual positions.

Note that when the light from the lighting device 20*a* is reflected at the cross section of the belt-like member WB, if specularly reflected light is oriented toward the image pick-up device 20, images of both the portions of rubber inside the cross section and the portions of each of the reinforcement cords RC are illuminated in white, and it is difficult to distinguish each of the reinforcement cords RC on the captured image G. However, in the present embodiment, the cut end surface ES diagonally inclined on the downstream end in the length direction of the belt-like member WB is used as the cross section, and therefore, the specularly reflected light is inhibited from being oriented toward the image pick-up device 20. As a result, each of the reinforcement cords RC can be reliably distinguished on the captured image G.

Below, control by the control device 30 and operations of the belt-like member cutting apparatus will be described with reference to FIGS. 7-14 including a flow chart depicted in FIG. 6. In the present embodiment, an explanation is made in which the belt-like member WB is cut and a plurality of the strip members SP each having fourteen of the reinforcement cords RC are created. Further, in an initial state, this belt-like member cutting apparatus is configured such that the cutter 10 is arranged at the first edge (an end on the left side on paper in FIG. 7) of the width direction of the belt-like member WB, and such that the image pick-up device 20 captures an image of the portion including the first edge in the width direction of the belt-like member WB. The image of the blades 10*a* of the cutter 10 is positioned within an angle of view of the image pick-up device 20. Further, the belt-like member cutting apparatus is configured such that the images of at least nineteen of the reinforcement cords RC appearing at the cut end surface ES of the belt-like member WB are arranged inside the angle of view of the image pick-up device 20.

First, when, in accordance with an instruction of the control unit 30*a*, the cut end surface ES of the belt-like member WB pulled out from the belt-like member wound body and the blades 10*a* of the cutter 10 are arranged inside the angle of view of the image pick-up device 20 (SA1), as depicted in FIG. 7, the position detecting unit 30*c* continuously detects, on the captured image G, the positions P1 of the images of the reinforcement cords RC along the width direction of the belt-like member WB, from the first side.

As illustrated in FIG. 8, on the basis of the position P1 of the image of the reinforcement cord RC first detected on the captured image G from the first side along the width direction of the belt-like member WB, the cutting position determining unit 30*f* sets a first cutting position Xa (SA2). Specifically, as illustrated in FIG. 8, a position that is, for example, 0.2 mm to the first edge (the left side on paper in FIG. 8) from the position P1 of the image of the first reinforcement cord RC from the first side in the width direction of the belt-like member WB, is set as the cutting position Xa.

Next, as illustrated in FIG. 9, in accordance with an instruction of the control unit 30*a*, the cutter 10 is moved by the width direction movement mechanism 12 in the width direction of the belt-like member WB toward the second side on the opposite side to the first edge, until the position P2 of the tip ends of the blades 10*a* of the cutter 10 is arranged at the first cutting position Xa (SA3). In addition, after closing the blades 10*a*, the control unit 30*a* controls the cutter 10 such that the blades 10*a* open. In this way, a cut is made in the downstream end in the length direction of the belt-like member WB (SA4).

Next, in accordance with an instruction of the control unit 30*a*, the image pick-up device 20 is moved toward the second side in the width direction of the belt-like member such that the cut formed by the processing at SA4 is positioned on an edge of the captured image G (SA5).

Next, the position detecting unit 30*c* detects the position P1 of the image of each of the reinforcement cords RC from the captured image G transmitted from the image pick-up device 20. Further, on the basis of the position P1 of the detected image of each of the reinforcement cords RC, the position detecting unit 30*c* determines, from the cutting position Xa on the first edge of the captured image G, detection numbers of the images of the reinforcement cords RC in order toward the second side (SA6). In addition, on the basis of the position of the detected image of each of the reinforcement cords RC and on the detection numbers, the actual number setting unit 30*e* determines an actual number of each of the reinforcement cords RC (SA7). On the basis of the actual numbers and the positions of the reinforcement cords RC, the cutting position determining unit 30*f* sets the next cutting position Xa by the cutter 10 (SA8). As will be described below, the actual number is a number obtained by correcting the detection number.

While processing from SA6 to SA8 will be described later, it should be noted that if an image of the weft thread appears in the captured image G, in actuality it is sometimes detected as the image of a single reinforcement cord formed by a plurality of the adjacent reinforcement cords RC being joined together. In this case, the detection number is assigned to the image of the single reinforcement cord instead of to the plurality of reinforcement cords RC. Therefore, in the present embodiment, even when the detection numbers of the plurality of reinforcement cords RC are assigned as the image of the single reinforcement cord, a number representing the actual order of the reinforcement cords RC is obtained by correcting the detection number, and this number is determined as the actual number. This actual number is used to set the cutting position Xa.

Next, the control unit 30*a* controls the width direction movement mechanism 12 to cause the cutter 10 to move toward the second side in the width direction of the belt-like member WB, until the position P2 of the tip ends of the blades 10*a* is arranged in the cutting position Xa (SA9).

Next, the control unit 30*a* controls the length direction movement mechanism 13 to cause the cutter 10 to move toward the upstream end in the length direction, and at the same time, controls the cutter 10 to close each of the blades 10*a*. Further, the control unit 30*a* controls the cutter 10 to cause each of the blades 10*a* to open, and at the same time, controls the length direction movement mechanism 13 to cause the cutter 10 to move toward the downstream end in the length direction (SA10). In this way, a cut C is made at the cutting position Xa on the downstream end in the length direction of the belt-like member WB.

Specifically, at step SA9, by causing the blades 10*a* to be arranged at the cutting position Xa, the cutter 10 is arranged in a position at which the cutting can be performed, between the fourteenth reinforcement cord RC and the fifteenth reinforcement cord RC from the position at which the immediately preceding cut was made.

Following this, step SA5 to step SA10 are repeated a predetermined number of times (22 times in the present embodiment) (SA11). In this way, twenty three of the cuts C are made in the downstream end in the length direction of the belt-like member WB.

Next, the above-described processing at SA6 to SA8 will be described in detail.

Figure 10:
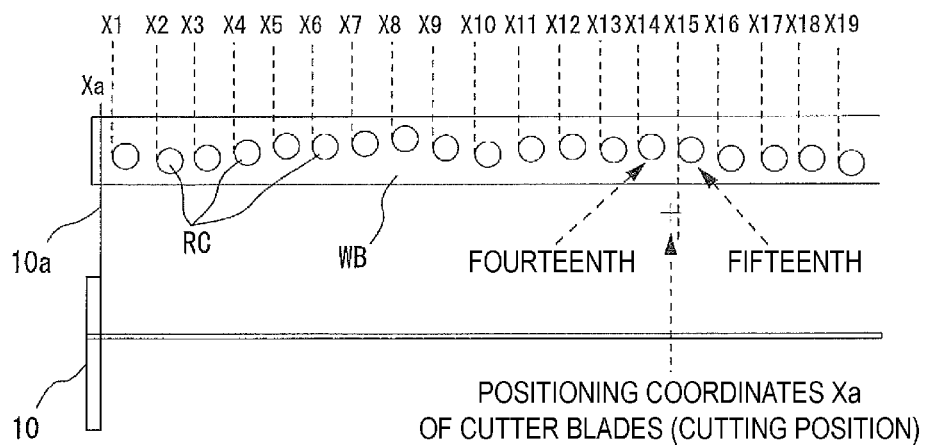
FIG. 10 is a diagram illustrating a method for determining a cutting position in a conventional example.
Figure 11:
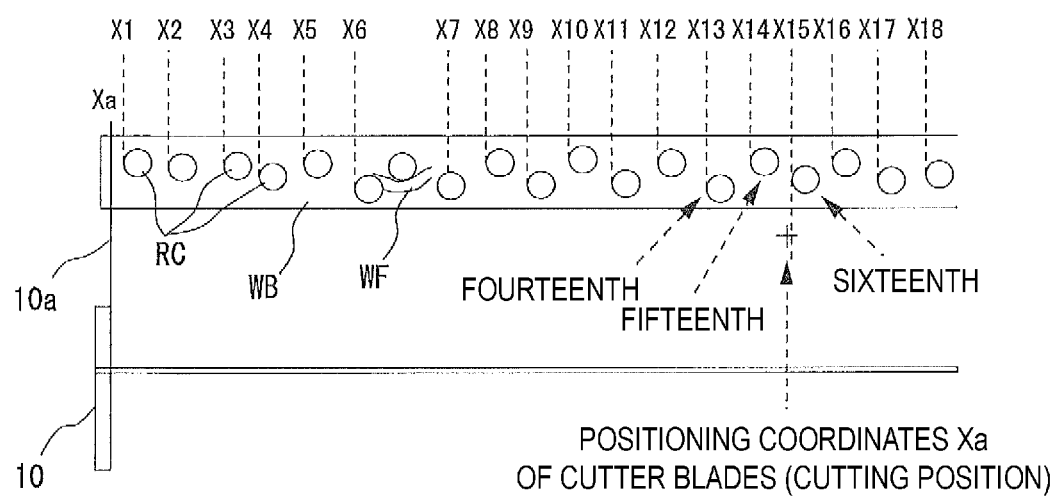
FIG. 11 is a diagram illustrating a method for determining a cutting position in a conventional example.

When the image of the weft thread joining the reinforcement cords RC does not appear in the cross section on the downstream end in the length direction of the belt-like member WB, as illustrated in FIG. 10, there is no displacement between the detection numbers of the images of the reinforcement cords RC automatically detected by the position detecting unit 30c and the actual numbers of the reinforcement cords RC counted from the first side in the width direction of the band-like member WB. Specifically, the position detecting unit 30c appropriately detects coordinates X1 to X14 of the image of each of the reinforcement cords RC without problem. However, when the weft thread joining the reinforcement cords RC appears in the cross section on the downstream end in the length direction of the belt-like member WB, as illustrated in FIG. 11, the adjacent reinforcement cords RC are joined by an image of a weft thread WF. In this case, the position detecting unit 30c detects the images of the plurality of the reinforcement cords RC as the image of the single reinforcement cord RC, and, as a result, assigns the detection number to the image of the single reinforcement cord RC. In the case of FIG. 11, the images of the sixth reinforcement cord and the seventh reinforcement cord are joined by the image of the weft thread WF, and the image of the eighth reinforcement cord is detected as the image of the seventh reinforcement cord. As a result, the image of the sixteenth reinforcement cord is detected as the image of the fifteenth. Taking this type of case into account, in the present embodiment, by performing processing depicted in flow charts in FIG. 12 and FIG. 13, the actual number, which represents which number the reinforcement cord actually is, is calculated from the number (detection number) of the image of the detected reinforcement cord, and thereby determined. In this way, even when the images of the adjacent reinforcement cords RC are joined together and the images of the plurality of reinforcement cords RC are detected as the image of the single reinforcement cord RC, the actual number allows the cutting position Xa to be set between the fourteenth reinforcement cord RC and the fifteenth reinforcement cord. The processing to determine the actual number by the calculation is performed by the interval calculating unit 30d and the actual number setting unit 30e.

Figure 12:
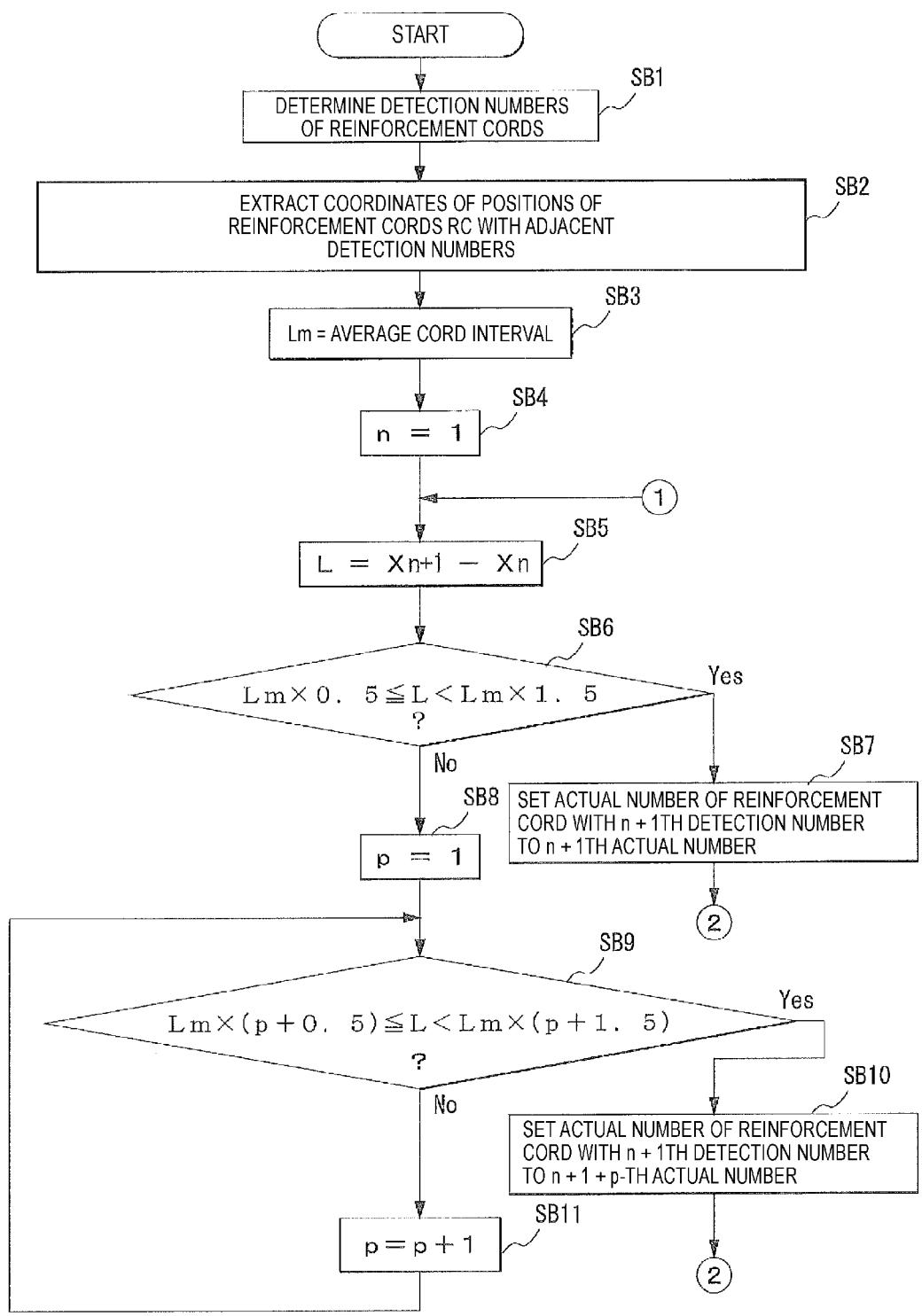
FIG. 12 is a flow chart depicting a method for determining a cutting position according to the embodiment of the present technology.
Figure 13:
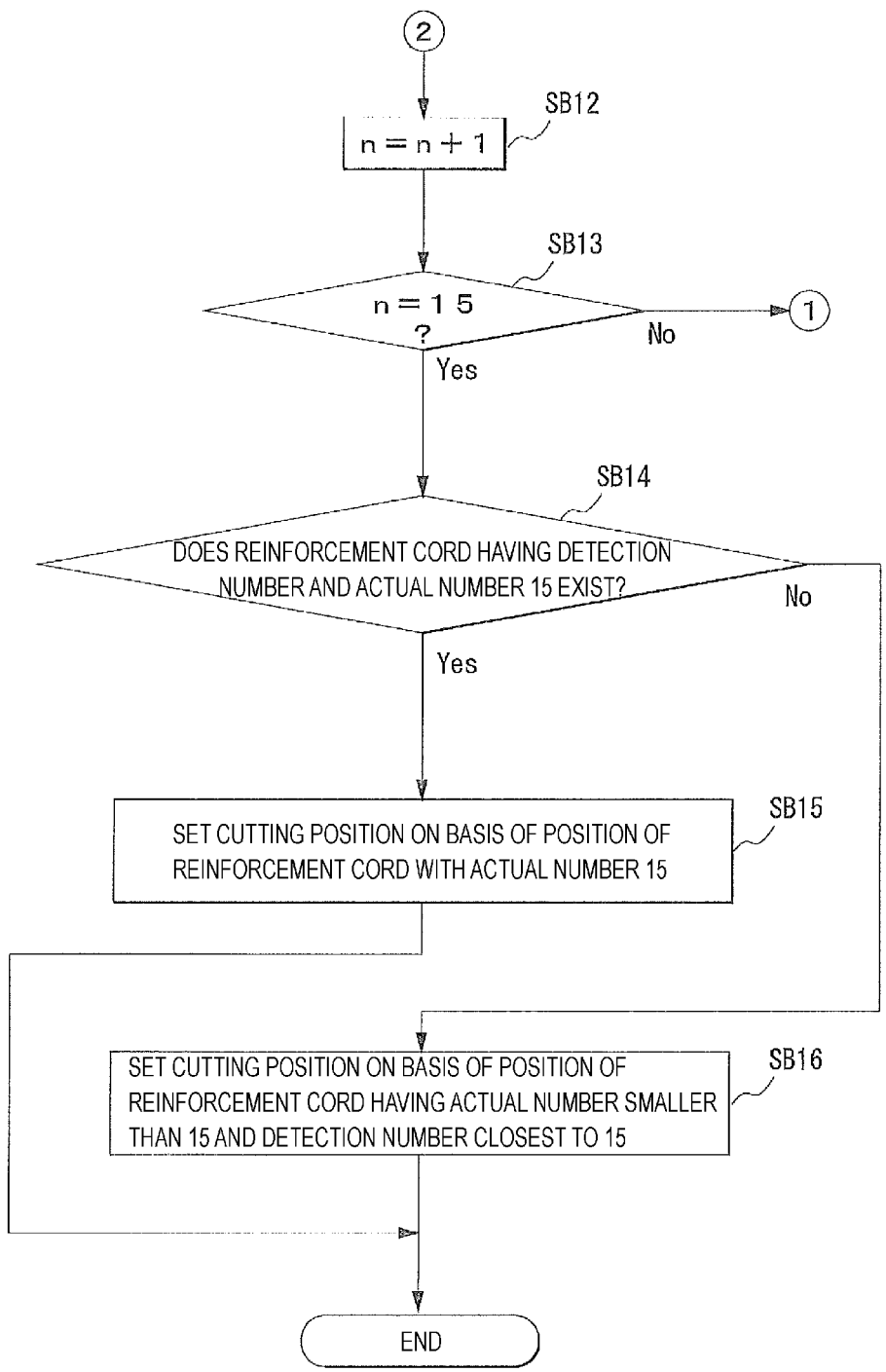
FIG. 13 is a flow chart depicting the method for determining the cutting position according to the embodiment of the present technology.

Next, the processing depicted in the flow charts in FIG. 12 and FIG. 13 will be described.

After determining the detection numbers of the images of each of the reinforcement cords RC detected by the position detecting unit 30c (SB1), the interval calculating unit 30d extracts coordinates of the positions, in relation to a reference position, of the images of the reinforcement cords RC having the adjacent detection numbers (SB2). The coordinates of the above-described positions are, for example, coordinates on an X axis extending in the width direction of the belt-like member WB, where the cutting position that has been established immediately before is taken as a position coordinate 0 (the reference position). The unit of the coordinates is mm (millimeters).

After that, the actual number setting unit 30e sets, as an average cord interval Lm, an average value of an interval between the adjacent reinforcement cords RC, which has been input in advance by an operator (SB3). For example, the value used as the average value of the interval between the adjacent reinforcement cords RC is obtained by dividing the width of the belt-like member WB or a width of a design target by a total number of the embedded reinforcement cords RC. The control device 30 further sets a variable n (=a natural number), indicated below, to 1 (SB4).

Next, the interval calculating unit 30d calculates an interval L (=Xn+1−Xn) between a coordinate Xn of the reinforcement cord RC having an n-th detection number from the reference position and a coordinate Xn+1 of the reinforcement cord RC having the n+1th detection number (SB5).

The actual number setting unit 30e determines whether or not the calculated interval L satisfies (Lm×0.5≤L<Lm×1.5) (SB6). In place of Lm×0.5≤L<Lm×1.5, Lm×k≤L<Lm×(2−k) may be used, where k is equal to or greater than 0.2 and equal to or less than 0.8. In this case, it is preferable that k=0.5. When variations in the interval between the reinforcement cords RC, centering on the average cord interval Lm, are large, it is preferable that the value of k be made smaller, and when the variations are small, that the value of k be made larger.

When, as a result of the above-described determination at SB6, the interval L satisfies (Lm×0.5≤L<Lm×1.5), the actual number setting unit 30e moves to processing at SB12 (to be described later) with the actual number of the reinforcement cord RC having the n+1th detection number set as the n+1th actual number (SB7). When the interval L does not satisfy (L×0.5≤L<Lm×1.5), the actual number setting unit 30e sets a variable p (a natural number) to 1 (SB8), and determines whether or not the interval L satisfies {Lm×(p+0.5)≤L<Lm×(p+1.5)} (SB9).

When, as a result of this determination, the interval L satisfies {Lm×(p+0.5)≤L<Lm×(p+1.5)}, the actual number setting unit 30e sets the actual number of the reinforcement cord RC having the n+1th detection number as the n+1+p-th actual number (SB10) and moves to the processing at SB12 (to be described later). When the interval L does not satisfy {Lm×(p+0.5)≤L<Lm×(p+1.5)}, the actual number setting unit 30e adds 1 to the value of the variable p and sets this as the new value of the variable p (SB11), then moves to the above-described determination processing at SB9.

When, as a result of the above-described determination at SB7, the interval L satisfies (Lm×0.5≤L<Lm×1.5), and when, as a result of the determination at the above-described SB10, the interval L satisfies {Lm×(p+0.5)≤L<Lm×(p+1.5)}, 1 is added to the variable n and set as the new value of the variable n (SB12), the actual number setting unit 30e determines whether or not the value of the variable n is equal to 15 (SB13). As a result of this determination, when the variable n is not equal to 15, the actual number setting unit 30e moves to the above-described processing at SB5, and when the variable n is equal to 15, the actual number setting unit 30e determines whether or not the reinforcement cord RC to which the detection number is assigned and for which the actual number is 15 actually exists (SB14).

In this way, in the present embodiment, depending on a ratio of the interval L between the adjacent reinforcement cords to the average cord interval Lm, of the detection numbers for the reinforcement cords having the adjacent detection numbers, the larger of the detection numbers is corrected so as to be a larger number and is set as the actual number.

Figure 14:
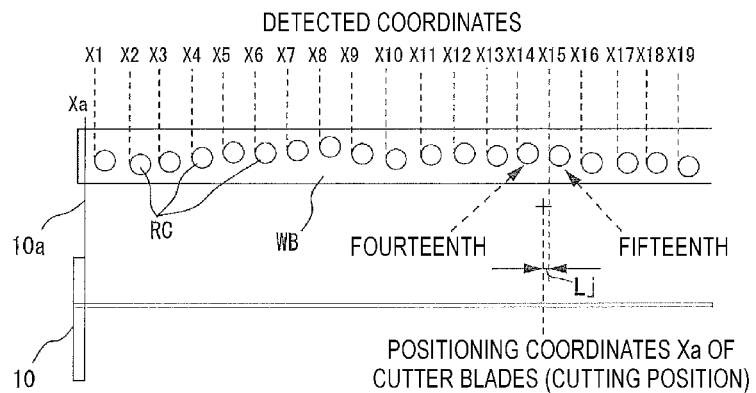
FIG. 14 is a diagram illustrating the method for determining the cutting position according to the embodiment of the present technology.

As a result of this determination, when the detection numbers are assigned to the images and the reinforcement cord RC having the actual number 15 exists, the cutting position determining unit 30f sets the cutting position Xa on the basis of the position of the reinforcement cord having the actual number 15 (SB15). For example, as illustrated in FIG. 14, when there are none of the reinforcement cords RC that have been joined by the weft thread WF, a value Lm×j is calculated by multiplying the average cord interval Lm by a coefficient j (where j is a number greater than 0 and less than 1), and the cutting position Xa is set as a position of an X coordinate value obtained by subtracting the value Lm×j from the position of a coordinate X15 of the reinforcement cord RC having the actual number 15. In this way, the cutting position Xa can be set between the reinforcement cord RC having the fourteenth actual number and the reinforcement cord RC having the fifteenth actual number, and the strip member having fourteen of the reinforcement cords RC can thus be manufactured. Note that in the present embodiment, the position of each of the reinforcement cords RC is established by the position of the end on the first edge, and a value of the coefficient j is therefore 0.2. It is preferable that the coefficient j be set as appropriate in accordance with the detection position of each of the reinforcement cords RC.

Figure 15:
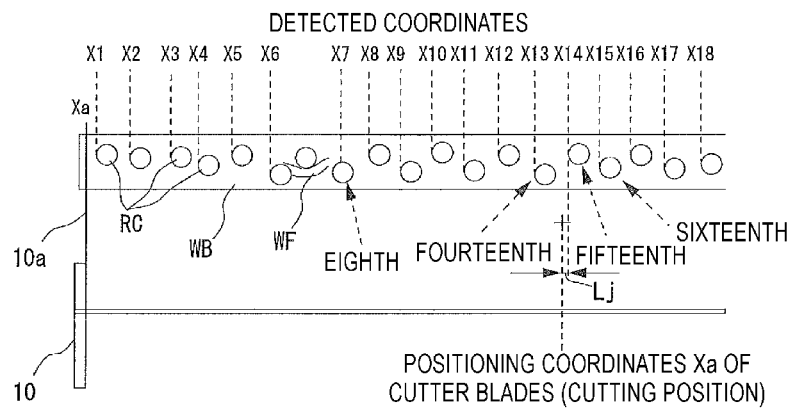
FIG. 15 is a diagram illustrating the method for determining the cutting position according to the embodiment of the present technology.

Further, for example, as illustrated in FIG. 15, when the sixth reinforcement cord RC and the seventh reinforcement cord RC are joined by the weft thread WF and the two reinforcement cords RC are thus detected as the image of the single reinforcement cord RC, the eighth reinforcement cord RC in actuality becomes the seventh detection number and the detection number is displaced by 1. However, as a result of the above-described processing, the reinforcement cord RC having the fifteenth actual number can be determined, and thus the cutting position determining unit 30f calculates the value Lm×j obtained by multiplying the average cord interval Lm by the coefficient j (where j is a number greater than 0 and less than 1), and sets the cutting position Xa as a position of an X coordinate value obtained by subtracting the value Lm×j from the position of the coordinate X14 of the reinforcement cord RC having the fifteenth actual number. In this way, the cutting position Xa can be set between the reinforcement cord RC having the fourteenth actual number and the reinforcement cord having the fifteenth actual number, and the strip member having fourteen of the reinforcement cords RC can thus be manufactured.

Figure 16:
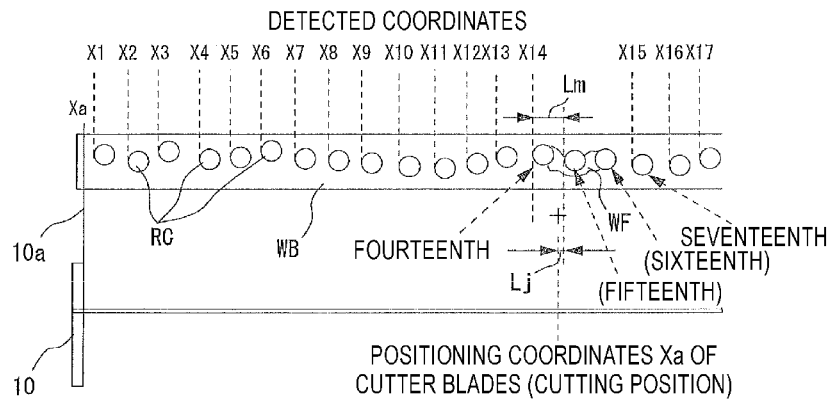
FIG. 16 is a diagram illustrating the method for determining the cutting position according to the embodiment of the present technology.

As a result of the determination at the above-described SB14, when the detection numbers are assigned and the reinforcement cord having the actual number 15 does not exist, the cutting position determining unit 30f sets the cutting position Xa on the basis of the actual number that is smaller than 15 and that is the largest of the actual numbers, namely, on the basis of the position of the reinforcement cord having the actual number that is closest to 15 (SB16). The largest number of the above-described actual numbers is assumed to be N. For example, as illustrated in FIG. 16, when the fourteenth to the sixteenth reinforcement cords RC are joined by the weft thread WF and the three reinforcement cords RC are thus detected as the image of the single reinforcement cord RC, the detection number of the seventeenth reinforcement cord RC becomes the fifteenth detection number and there is displacement of the detection numbers. However, as a result of the above processing, the reinforcement cord RC having the fifteenth detection number is established to be the reinforcement cord RC having the seventeenth actual number. Thus, the cutting position determining unit 30f sets the cutting position Xa while taking as reference the coordinate X14 of the image of the reinforcement cord RC having the fourteenth actual number, which is detected one before the fifteenth reinforcement cord RC. In this case, specifically, an actual number N of the reinforcement cord RC having the fourteenth detection number is the fourteenth actual number, and thus the cutting position Xa is set to a position specified by X14+{Lm×(15−N)−Lm×j} (where j is a number greater than 0 and less than 1). In an example illustrated in FIG. 16, the actual number N=14 is the largest of the existing numbers, but there are cases in which there is no actual number N=14, and the actual number is N=12 or 13. Therefore, in the present embodiment, the cutting position Xa is set to be in a position separated by Lm×(t+1−N)−Lm×j (where j is a number greater than 0 and less than 1) from the position of the reinforcement cord having the actual number N. In this case, the fact that the actual number N is the largest number equal to or less than 15 is preferable from the point of view of accurately setting the cutting position Xa.

Figure 17:
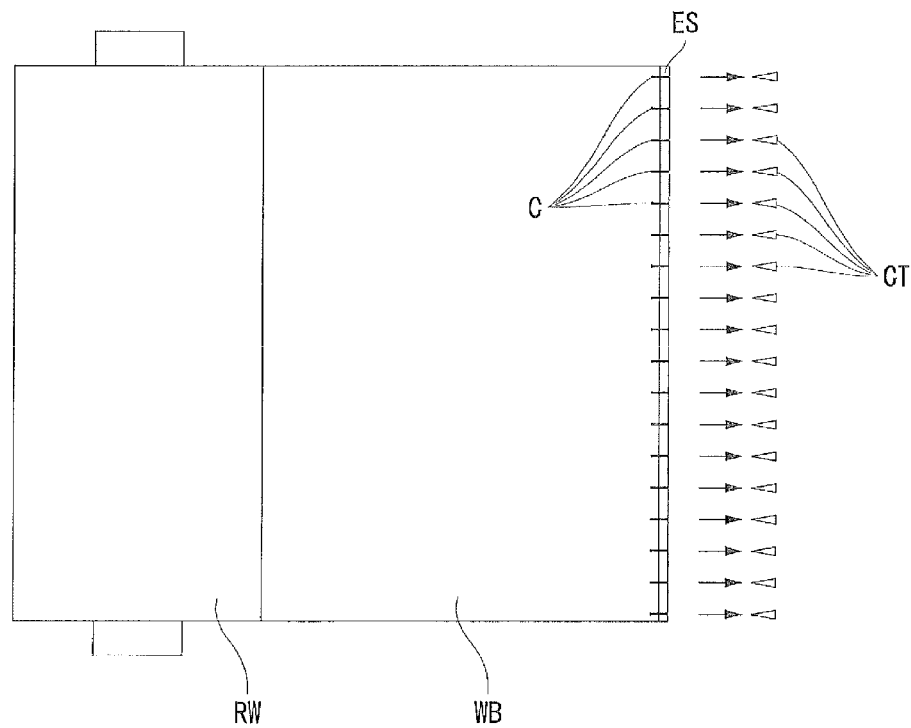
FIG. 17 is an explanatory diagram of operations of the belt-like member cutting apparatus.
Figure 18:
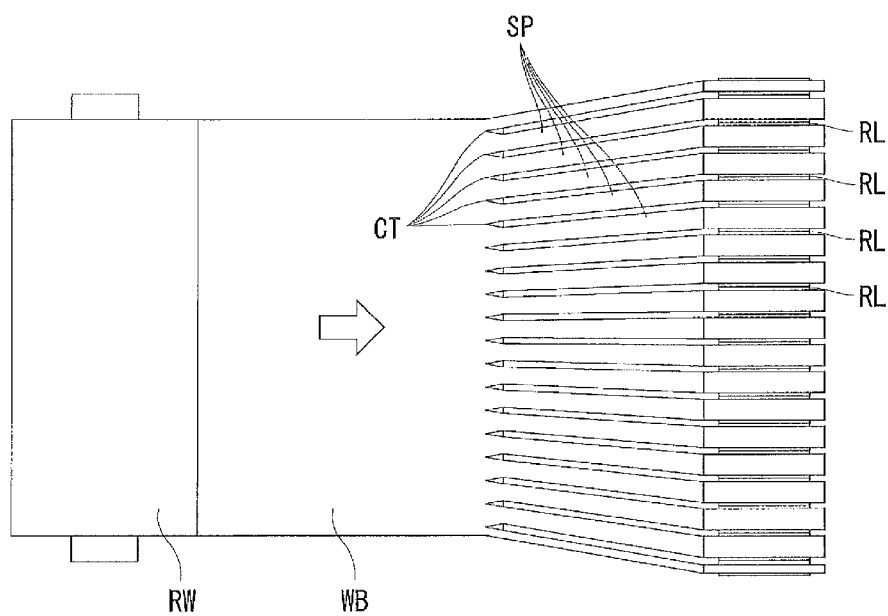
FIG. 18 is an explanatory diagram of operations of the belt-like member cutting apparatus.

Next, as illustrated in FIG. 17, a plurality of (eighteen in the present embodiment) cutting blades CT, which are provided at intervals in the width direction of the belt-like member WB, are inserted into each of the cuts C. Next, as illustrated in FIG. 18, the downstream ends of each of the plurality of strip members SP formed by each of the cutting blades CT passing through the belt-like member WB are each mounted on the winding rollers RL. At the same time, each of the strip members SP is wound on by each of the winding rollers RL and the belt-like member WB is thus cut along the reinforcement cords RC, and the plurality of strip members SP are formed. An operation to insert each of the cutting blades CT into each of the cuts C can be performed automatically using a known conveyor or the like, and can also be performed manually by an operator.

In this way, according to the method for cutting the belt-like member and the apparatus therefor of the present embodiment, the image pick-up device 20 can capture an image of the cross section at the one end in the length direction of the belt-like member WB having embedded therein the plurality of reinforcement cords RC arranged in parallel to each other and the weft thread WF that intersects the reinforcement cords RC. The position detecting unit 30b of the control device 30 detects the positions, in the width direction of the belt-like member WB, of the images of each of the reinforcement cords RC appearing in the cross section on the captured image obtained by the image capture. At the same time, the position detecting unit 30b sets the detection numbers representing the order of arrangement of the reinforcement cords RC from the side of the first edge in the width direction of the belt-like member WB. After that, the interval calculating unit 30d of the control device 30 calculates the interval L between the reinforcement cords RC having the adjacent detection numbers. Depending on the ratio of the interval L to the average cord interval Lm between the adjacent reinforcement cords, of the detection numbers for the reinforcement cords having the adjacent detection numbers, the actual number setting unit 30e corrects the larger of the detection numbers so as to be a larger number and sets this as the actual number. Then, the cutting position determining unit 30f uses the actual number to determine the cutting position in the width direction of the belt-like member WB. As a result, the strip member SP formed by cutting the belt-like member WB can be reliably provided with the desired number of reinforcement cords RC.

Specifically, the position detecting unit 30c of the control device 30 detects the positions P1 of the images of each of the reinforcement cords RC appearing on the downstream end in the length direction of the belt-like member WB on the captured image G, and the position P2 of the image of the tip ends of the blades 10a of the cutter 10. Further, the actual number setting unit 30e uses the captured image G and determines the actual numbers on the basis of the detection numbers and the positions of the images of the detected reinforcement cords. The control unit 30a moves the cutter 10 until the cutter 10 is arranged in the position at which the cutting can be performed between the reinforcement cord having a predetermined actual number (the fourteenth in the present embodiment), and the next (the fifteenth in the present embodiment) reinforcement cord RC. After that, the control unit 30a controls the cutter 10 to cause the cutter 10 to make the cuts C in the one end in the length direction of the belt-like member WB. After that, the plurality of cutting blades CT provided at mutual intervals in the width direction of the belt-like member WB are inserted into each of the cuts C made in the downstream end in the length direction of the belt-like member WB, and the belt-like member WB is severed along the reinforcement cords RC by each of the cutting blades CT. In this way, the plurality of strip members SP each having the desired number of reinforcement cords RC are formed. Specifically, each of the strip members SP can be reliably provided with the desired number of reinforcement cords RC. Use of the strip members SP in a tire is extremely advantageous in achieving an improvement in tire quality.

In the present embodiment, when the interval L and the average interval Lm satisfy $Lm \times (p+k) \leq L < Lm \times (p+2-k)$ (where p is an integer equal to or greater than 0, and k is a number equal to or greater 0.2 and equal to or less than 0.8), it is preferable that the actual number setting unit 30e set, for the larger of the detection numbers of the adjacent reinforcement cords RC, a sum of the larger detection number and the integer p as the actual number.

Further, it is preferable that the cutting position Xa determined by the cutting position determining unit 30f be a position between the adjacent reinforcement cords among the reinforcement cords RC.

When manufacturing the strip member SP having embedded therein a number t (t is a natural number) of the reinforcement cords RC, when the reinforcement cord RC having the t-th actual number is not detected and the N-th reinforcement cord RC whose actual number is smaller than the t-th actual number is detected, it is preferable that the cutting position determining unit 30f use the position of the N-th reinforcement cord RC and the average cord interval Lm to determine the cutting position Xa.

At this time, it is preferable that the N-th reinforcement cord RC be the reinforcement cord having the largest number among the plurality of actual numbers that are smaller than the t-th actual number.

It is preferable that the cutting position determining unit 30f determine the position of the cutting position Xa so as to be separated from the position of the N-th reinforcement cord RC to the side opposite to the first edge in the width direction, by $Lm \times (t+1-N) - Lm \times j$ (where j is a number greater than 0 and less than 1).

It is preferable that the positions, in the width direction of the belt-like member WB, of the images of the reinforcement cords RC be the positions of end portions of the images of the reinforcement cords RC in the width direction.

As in the present embodiment, after the cutting position Xa has been determined and the cut C has been made in the cutting positions Xa, it is preferable to repeat the following:

(1) to perform, with respect to portions of the belt-like member WB to be cut on the basis of the determination of the cutting position Xa, image capture of the cross section of the one end in the length direction of the belt-like member WB at a portion adjoining the opposite side to the first side, (2) to detect the positions, in the width direction of the belt-like member WB, of the images of each of the reinforcement cords RC appearing in the cross section on the captured image G obtained by the image capture, (3) to use the captured image G of the adjoining portion to set the detection numbers representing the order of arrangement, from the first side in the width direction of the belt-like member WB, of the reinforcement cords of the above-described adjoining portion, (4) to calculate the interval L between the reinforcement cords for the reinforcement cords RC having the adjacent detection numbers, and, depending on the ratio of the interval L to the average cord interval Lm between the adjacent reinforcement cords, of the detection numbers of the reinforcement cords having the adjacent detection numbers, to correct the larger detection number so as to be a larger number and set this as the actual number, and (5) to determine, using the actual number, the cutting position in the width direction of the belt-like member WB, such that the number of the reinforcement cords included in the strip members SP formed by the belt-like member WB is a set number.

In the captured image G, in addition to the images of the reinforcement cords RC, the image of the weft thread may also be captured.

As in the present embodiment, after one of the cuts C has been formed in the cutting position Xa at the downstream end in the length direction of the belt-like member WB, it is preferable that the image pick-up device 20 be moved toward the second side in the width direction of the belt-like member WB such that the tip ends of the blades 10a of the cutting apparatus 20 are arranged in an end portion inside the angle of view of the image pick-up device 20. In this way, as in the present embodiment, for example, even when performing cutting of the belt-like member WB having the 240 reinforcement cords RC, there is no need for the image pick-up device 20 to capture the image of the 240 reinforcement cords RC at once, there is also no need to unnecessarily improve the resolution of the image pick-up device 20, and there is also no need to arrange a plurality of the image pick-up devices 20 in the width direction of the belt-like member WB. This point is extremely advantageous from the point of view of achieving device simplification and reducing manufacturing costs.

As in the present embodiment, it is preferable that the belt-like member WB be used that is diagonally inclined on the downstream end in the length direction such that the cut end surface ES is oriented toward the one side in the thickness direction of the belt-like member WB, and that the image pick-up device 20 capture the image of the downstream end in the length direction of the belt-like member WB, from the one side in the thickness direction of the belt-like member WB. In this way, in comparison to a case in which the cut end surface ES has a surface that is substantially vertical on the downstream end in the length direction such that the surface faces in the length direction of the belt-like member WB, and the image pick-up device 20 performs the image capture of the cut end surface ES from the length direction of the belt-like member WB, the cutting apparatus 10 and the image pick-up device 20 can be easily arranged such that there is no mutual interference in the arrangement thereof, and this is extremely advantageous in achieving device simplification.

By diagonally cutting the downstream end in the length direction of the belt-like member WB, even when the lighting device 20a, for example, is configured to illuminate the cut end surface ES on the downstream end in the length direction of the belt-like member WB from a position in the vicinity of the image pick-up device 20, specularly reflected light is inhibited from being oriented toward the image pick-up device 20, and each of the reinforcement cords RC can be reliably distinguished on the captured image G. This is extremely advantageous in terms of accurately performing the cutting of the belt-like member WB. In the present embodiment, the lighting device 20a is commonly used with the image pick-up device 20, and thus, making the cut end surface ES on the downstream end in the length direction of the belt-like member WB the inclined surface is extremely advantageous in terms of accurately performing the cutting of the belt-like member WB.

In addition, it is preferable to make the angle α formed by the cut end surface ES and the one surface in the thickness direction of the belt-like member be equal to or greater than 30 degrees and equal to or less than 60 degrees, in terms of easily and reliably distinguishing each of the reinforcement cords RC on the captured image G. Specifically, when the angle α is less than 30 degrees, the specularly reflected light is easily oriented toward the image pick-up device 20, and when the angle α exceeds 60 degrees, cases occur in which, depending on the position of the image pick-up device 20, the image of each of the reinforcement cords RC cannot be reliably captured. It is therefore preferable for the angle α to be equal to or greater than 30 degrees and equal to or less than 60 degrees.

Figure 19:
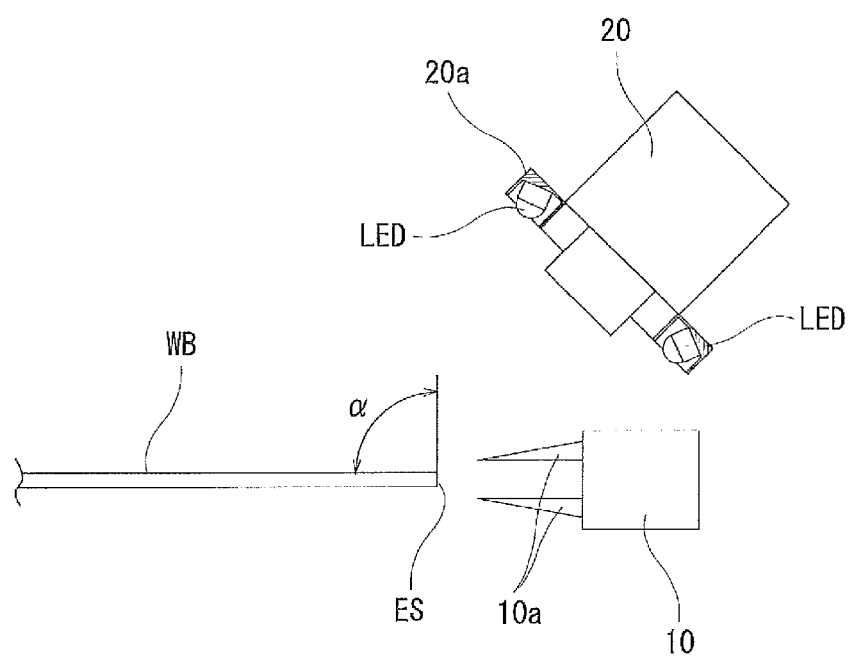
FIG. 19 is a schematic view illustrating positional relationships between the image pick-up position, the cutter and the belt-like member according to a modified example of the embodiment of the present technology.

In the present embodiment, the image pick-up device 20 performs the image capture such that the image of the one end in the length direction of the belt-like member WB is captured from the one side in the thickness direction of the belt-like member WB. With respect to this, as illustrated in FIG. 19, it is also preferable that the image pick-up device 20 perform the image capture of the downstream end in the length direction of the belt-like member WB from an inclined direction that is inclined with respect to the length direction and the thickness direction of the belt-like member WB. Here, in FIG. 19, the downstream end in the length direction of the belt-like member WB is cut substantially vertically with respect to the one surface in the thickness direction of the belt-like member WB, and the angle α formed between the cut end surface ES and the one surface in the thickness direction of the belt-like member WB is substantially 90 degrees. In this case, by performing the image capture of the cut end surface ES on the downstream end in the length direction of the belt-like member WB from the diagonal direction, even when the lighting device 20a, for example, illuminates the cut end surface ES on the downstream end in the length direction of the belt-like member WB from a position in the vicinity of the image pick-up device 20, the specularly reflected light is inhibited from being oriented toward the image pick-up device 20, and each of the reinforcement cords RC can be reliably distinguished on the captured image G. Therefore, a mode of the lighting and the cut end surface ES as illustrated in FIG. 19 is extremely advantageous in terms of accurately performing the cutting of the belt-like member WB.

Even when the end surface on the downstream end in the length direction of the belt-like member WB is diagonally inclined, as long as the specularly reflected light is not oriented toward the image pick-up device 20, as illustrated in FIG. 19, it is preferable that the image pick-up device 20 perform the image capture from the inclined direction that is inclined with respect to the length direction and the thickness direction of the belt-like member WB. Even in this case, the same operational effects can be achieved as in the example illustrated in FIG. 19. Further, the image capture of the downstream end in the length direction of the belt-like member WB by the image pick-up device 20 can be performed from the length direction of the belt-like member WB. In this case also, the same operational effects as those described above can be achieved.

In the present embodiment, the example is given in which, on the captured image G, the first side (the end on the left side on paper in FIG. 7) of each of the reinforcement cords RC is detected as the position P1 of each of the reinforcement cords RC. However, another position of each of the reinforcement cords RC can be detected as the position of each of the reinforcement cords RC.

In the present embodiment, the example is given in which the 70 ends belt-like member WB is cut, but the present technology is not limited to the 70 ends example. For example, the technology of the present embodiment can be applied to a case such as when a 50 ends belt-like member, in which 50 reinforcement cords are arranged over a 50 mm width, is used and strip members having 10 reinforcement cords are formed.

An average cord interval of the whole of the belt-like member WB may be used as the average cord interval Lm. However, there is a tendency for a density of the reinforcement cords RC to be greater at both end portions in the width direction than at a central portion in the width direction of the belt-like member WB. It is thus preferable for the actual number setting unit 30e to actually measure and acquire, in advance, a distribution of the average cord interval Lm for each of locations of the belt-like member WB and for the acquired distribution to be used to set the average cord interval Lm corresponding to each of the locations of the belt-like member from which the strip member is to be made.

Further, in the present embodiment, the example is given in which, on the captured image G, the tip ends of the blades 10a of the cutter 10 are detected as the position P2 of the cutter 10. However, another position of the cutter 10 can be detected as the position of the cutter 10.

INDUSTRIAL APPLICABILITY

The present technology relates to a method for cutting a belt-like member, having embedded therein a plurality of reinforcement cords, along the reinforcement cords, and an apparatus therefor, in order to manufacture strip members that are wound onto an outer peripheral surface of a belt member in manufacturing steps of an automobile tire, for example. In the present technology, a position of each of reinforcement cords is detected from a captured image, and, on the basis of an interval between the detected adjacent reinforcement cords and an average cord interval, a cutting position is set, determining which of each of the reinforcement cords is actually the reinforcement cord of a specific number. As a result, the number of the reinforcement cords of the strip member formed by cutting the belt-like member can be reliably ensured to be a desired number.

The invention claimed is:

1. A method for cutting a belt member for manufacturing a plurality of strip members by cutting the belt member in a length direction of the belt member, the method for cutting the belt member comprising the steps of:

performing image capture of a cross section of one end in a length direction of a belt member having embedded therein a plurality of reinforcement cords arranged in parallel to each other and a weft thread intersecting the reinforcement cords;

detecting a position, in a width direction of the belt member, of an image of each of the reinforcement cords appearing in the cross section within a captured image obtained by the image capture, along with setting detection numbers representing an arrangement order of the reinforcement cords from a first edge in the width direction of the belt member;

calculating an interval L between the reinforcement cords for which the detection numbers of the reinforcement cords are adjacent to each other;

setting an actual number that is obtained by correcting, depending on a ratio of the interval L to an average cord interval Lm between the adjacent reinforcement cords, a larger detection number of the detection numbers of the reinforcement cords for which the detection numbers are adjacent to each other so as to make the larger detection number larger;

determining a cutting position in the width direction of the belt member using the actual number, such that the number of the reinforcement cords included in a strip member made from the belt member is a set number; and cutting the belt member at the cutting position.

2. The method for cutting the belt member according to claim 1, wherein when the interval L and the average cord interval Lm satisfy $Lm \times (p+k) \leq L < Lm \times (p+2-k)$, where p is an integer equal to or greater than 0, and k is a number equal to or greater than 0.2 and equal to or less than 0.8, with respect to a larger detection number of the detection numbers of the adjacent reinforcement cords, a sum of the larger detection number and the integer p is set as the actual number.

3. The method for cutting the belt member according to claim 1, wherein the cutting position is a position between the adjacent reinforcement cords among the reinforcement cords.

4. The method for cutting the belt member according to claim 1, wherein upon manufacturing the strip member having embedded therein a number t that is a natural number of the reinforcement cords, when the reinforcement cord having a t-th actual number is not detected and the reinforcement cord having an N-th actual number that is smaller than the t-th actual number is detected, the cutting position is established using a position of the N-th reinforcement cord and the average cord interval Lm.

5. The method for cutting the belt member according to claim 4, wherein the N-th reinforcement cord is the reinforcement cord having a largest number among a plurality of actual numbers smaller than the t-th actual number.

6. The method for cutting the belt member according to claim 4, wherein the cutting position is established as a position separated from the position of the N-th reinforcement cord to a side opposite to the first edge in the width direction, by $Lm \times (t+1-N) - Lm \times j$, where j is a number greater than 0 and less than 1.

7. The method for cutting the belt member according to claim 1, wherein a position of the image of each of the reinforcement cords in the width direction of the belt member is a position of an end portion of the image of each of the reinforcement cords in the width direction.

8. The method for cutting the belt member according to claim 1, wherein a distribution of the average cord interval for each of locations of the belt member is acquired in advance, and using the distribution, the average cord interval Lm is set corresponding to each of the locations of the belt member from which the strip members are to be made.

9. The method for cutting the belt member according to claim 1, wherein after the cutting position has been determined and a cut has been made in the cutting position, the following steps are repeated:

performing, with respect to a portion of the belt member to be cut on a basis of the determination of the cutting position, image capture of a cross section of the one end in the length direction of the belt member at a portion adjoining an opposite side to the first edge;

detecting the position, in the width direction of the belt member, of the image of each of the reinforcement cords appearing in the cross section on the captured image of the adjoining portion obtained by the image capture;

setting the detection numbers representing an order of arrangement, from the first edge in the width direction of the belt member, of the reinforcement cords of the adjoining portion using the captured image of the adjoining portion;

calculating an interval L between the reinforcement cords for which the detection numbers of the reinforcement cords are adjacent;

setting an actual number that is obtained by correcting, depending on a ratio of the interval L to the average cord interval Lm between the adjacent reinforcement cords, the larger detection number of the detection numbers of the reinforcement cords for which the detection numbers are adjacent to each other so as to make the larger detection number larger;

determining a cutting position in the width direction of the belt member using the actual number, such that the number of the reinforcement cords included in the strip member made by the belt member is a set number; and cutting the belt member at the cutting position.

10. The method for cutting the belt member according to claim 1, wherein, in the captured image, an image of the weft thread is also captured in addition to the image of each of the reinforcement cords.

11. The method for cutting the belt member according to claim 1, wherein:

the strip member having embedded therein a number t that is a natural number of the reinforcement cords is manufactured, when the interval L and the average cord interval Lm satisfy $Lm \times (p+k) \leq L < Lm \times (p+2-k)$, where p is an integer equal to or greater than 0, and k is a number equal to or greater than 0.2 and equal to or less than 0.8, with respect to a larger detection number of the detection numbers of the adjacent reinforcement cords, a sum of the larger detection number and the integer p is set as the actual number, and when the reinforcement cord having a t-th actual number is not detected and the reinforcement cord having an N-th actual number that is smaller than the t-th actual number is detected, the cutting position is established between the adjacent reinforcement cords among the reinforcement cords, using a position of the N-th reinforcement cord and the average cord interval Lm.

12. The method for cutting the belt member according to claim 11, wherein the N-th reinforcement cord is the reinforcement cord having a largest number among a plurality of actual numbers smaller than the t-th actual number.

13. The method for cutting the belt member according to claim 11, wherein the cutting position is established as a position separated from the position of the N-th reinforcement cord to a side opposite to the first edge in the width direction, by $Lm \times (t+1-N) - Lm \times j$, where j is a number greater than 0 and less than 1.

14. A belt member cutting apparatus for manufacturing a plurality of strip members by cutting a belt member in a length direction of the belt member, the cutting apparatus comprising an image pick-up device, a cutter, and a control device, the image pick-up device configured to obtain a captured image of a cross section of one end in a length direction of a belt member having embedded therein a plurality of reinforcement cords arranged in parallel to each other and a weft thread intersecting the reinforcement cords, the control device comprising:

a position detecting unit configured to detect a position in a width direction of the belt member of an image of each of the reinforcement cords appearing in the cross section, the image being captured by the image pick-up device, and to set detection numbers representing an arrangement order of the reinforcement cords from a first edge in the width direction of the belt member;

an interval calculating unit configured to calculate an interval L between the reinforcement cords for which the detection numbers of the reinforcement cords are adjacent to each other;

an actual number setting unit configured to set an actual number that is obtained by correcting, depending on a ratio of the interval L to an average cord interval Lm between the adjacent reinforcement cords, a larger detection number of the detection numbers of the reinforcement cords for which the detection numbers are adjacent to each other such that the larger detection number is made larger; and a cutting position determining unit configured to determine a cutting position in the width direction of the belt member using the actual number, such that the number of the reinforcement cords included in a strip member made from the belt member is a set number;

the cutter being controlled by the control device to cut the belt member at the determined cutting position.

15. The belt member cutting apparatus according to claim 14, wherein when the L and the Lm satisfy $Lm \times (p+k) \leq L < Lm \times (p+2-k)$, where p is an integer equal to or greater than 0, and k is a number equal to or greater than 0.2 and equal to or less than 0.8, with respect to the larger detection number of the detection numbers of the adjacent reinforcement cords, the actual number setting unit sets a sum of the larger detection number and the integer p as the actual number.

16. The belt member cutting apparatus according to claim 14, wherein the cutting position determined by the cutting position determining unit is a position between the adjacent reinforcement cords among the reinforcement cords.

17. The belt member cutting apparatus according to claim 14, wherein when manufacturing the strip member having embedded therein a number t that is a natural number of the reinforcement cords, when the cutting position determining unit does not detect the reinforcement cord having a t-th actual number and detects the reinforcement cord having an N-th actual number that is smaller than the t-th actual number, the cutting position is established using a position of the N-th reinforcement cord and the average cord interval Lm.

18. The belt member cutting apparatus according to claim 17, wherein the N-th reinforcement cord is the reinforcement cord having a largest number among a plurality of actual numbers smaller than the t-th actual number.

19. The belt member cutting apparatus according to claim 17, wherein the cutting position determining unit establishes the cutting position as a position separated from the position of the N-th reinforcement cord to a side opposite to the first edge in the width direction, by $Lm \times (t+1-N) - Lm \times j$, where j is a number greater than 0 and less than 1.

20. The belt member cutting apparatus according to claim 14, wherein the position detecting unit establishes, as the position, in the width direction of the belt member, of the image of each of the reinforcement cords, a position of an end portion in the width direction of the image of each of the reinforcement cords.

21. The belt member cutting apparatus according to claim 14, wherein the actual number setting unit acquires in advance a distribution of the average cord interval for each of locations on the belt member, and uses the distribution to set the average cord interval Lm corresponding to each of the locations on the belt member from which the strip member is to be made.

22. The belt member cutting apparatus according to claim 14, wherein:

for the strip member having embedded therein a number t that is a natural number of the reinforcement cords, when the L and the Lm satisfy $Lm \times (p+k) \leq L < Lm \times (p+2-k)$, where p is an integer equal to or greater than 0, and k is a number equal to or greater than 0.2 and equal to or less than 0.8, with respect to the larger detection number of the detection numbers of the adjacent reinforcement cords, the actual number setting unit sets a sum of the larger detection number and the integer p as the actual number; and when the cutting position determining unit does not detect the reinforcement cord having a t-th actual number and detects the reinforcement cord having an N-th actual number that is smaller than the t-th actual number, the cutting position determining unit establishes the cutting position between the adjacent reinforcement cords among the reinforcement cords, using a position of the N-th reinforcement cord and the average cord interval Lm, the cutting position being between the adjacent reinforcement cords among the reinforcement cords.

23. The belt member cutting apparatus according to claim 22, wherein the N-th reinforcement cord is the reinforcement cord having a largest number among a plurality of actual numbers smaller than the t-th actual number.

24. The belt member cutting apparatus according to claim 22, wherein the cutting position determining unit establishes the cutting position as a position separated from the position of the N-th reinforcement cord to a side opposite to the first edge in the width direction, by $Lm \times (t+1-N) - Lm \times j$, where j is a number greater than 0 and less than 1.

* * * * *